March 7, 1944. E. W. CARROLL 2,343,496
SINGLE STAGE FRUIT ORIENTING AND PITTING MACHINE
Filed June 6, 1941 4 Sheets-Sheet 1
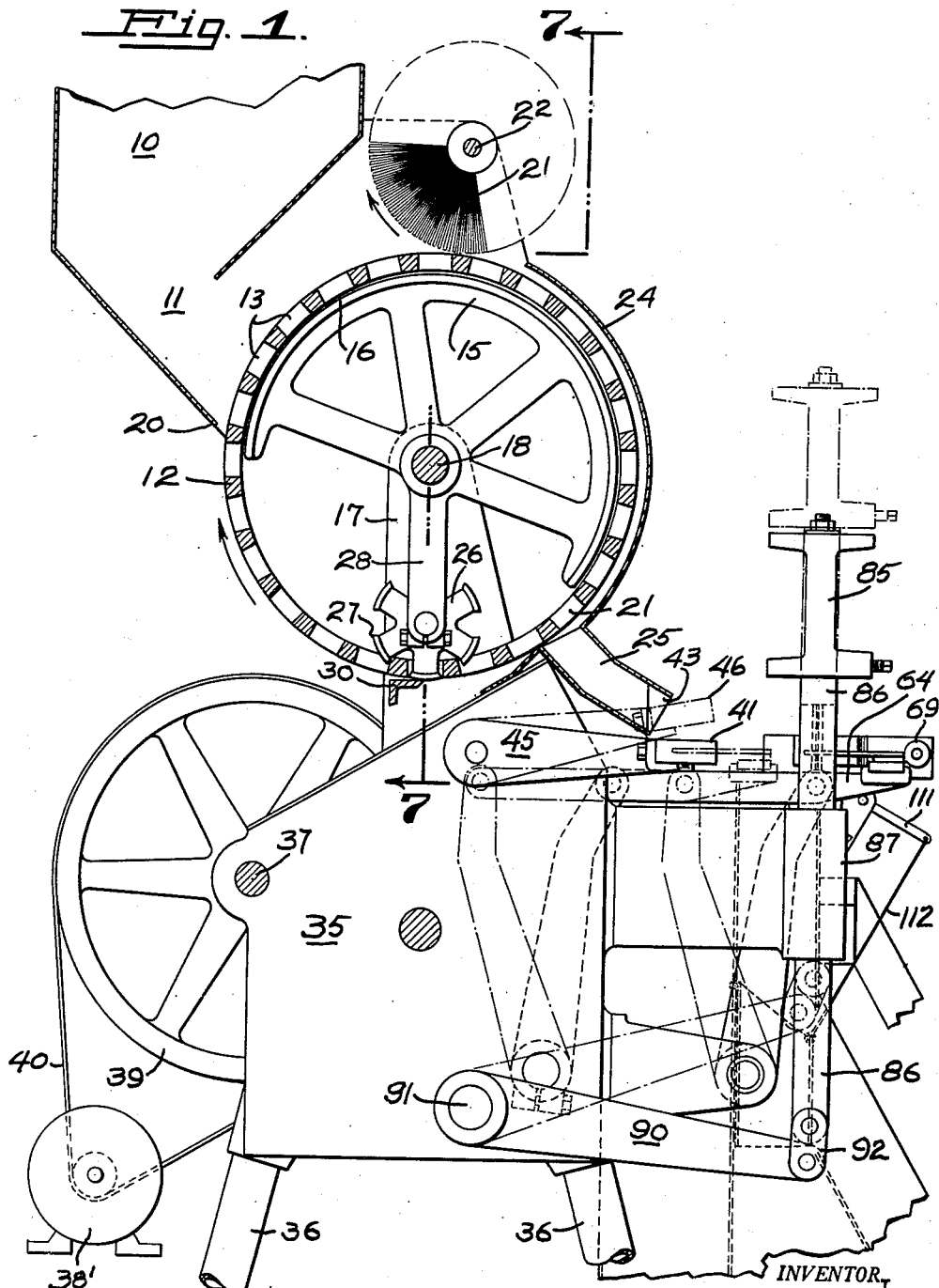
INVENTOR,
ELLSWORTH W. CARROLL.
BY
*Lippincott & Metcalf*
ATTORNEYS.

March 7, 1944. E. W. CARROLL 2,343,496
SINGLE STAGE FRUIT ORIENTING AND PITTING MACHINE
Filed June 6, 1941 4 Sheets-Sheet 2
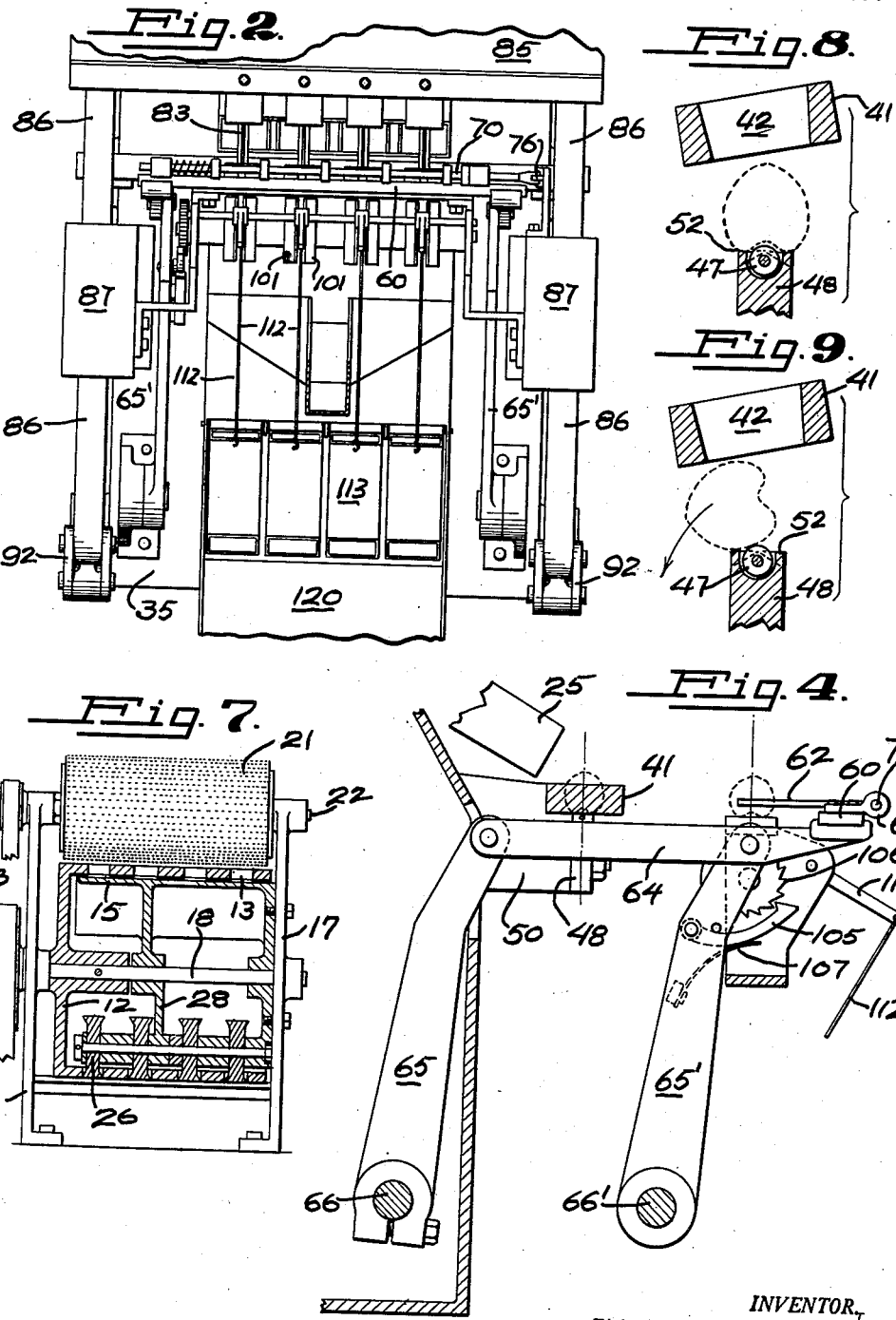
INVENTOR,
ELLSWORTH W. CARROLL.
BY
Lippincott & Metcalf
ATTORNEYS.

March 7, 1944.  E. W. CARROLL  2,343,496
SINGLE STAGE FRUIT ORIENTING AND PITTING MACHINE
Filed June 6, 1941  4 Sheets-Sheet 3
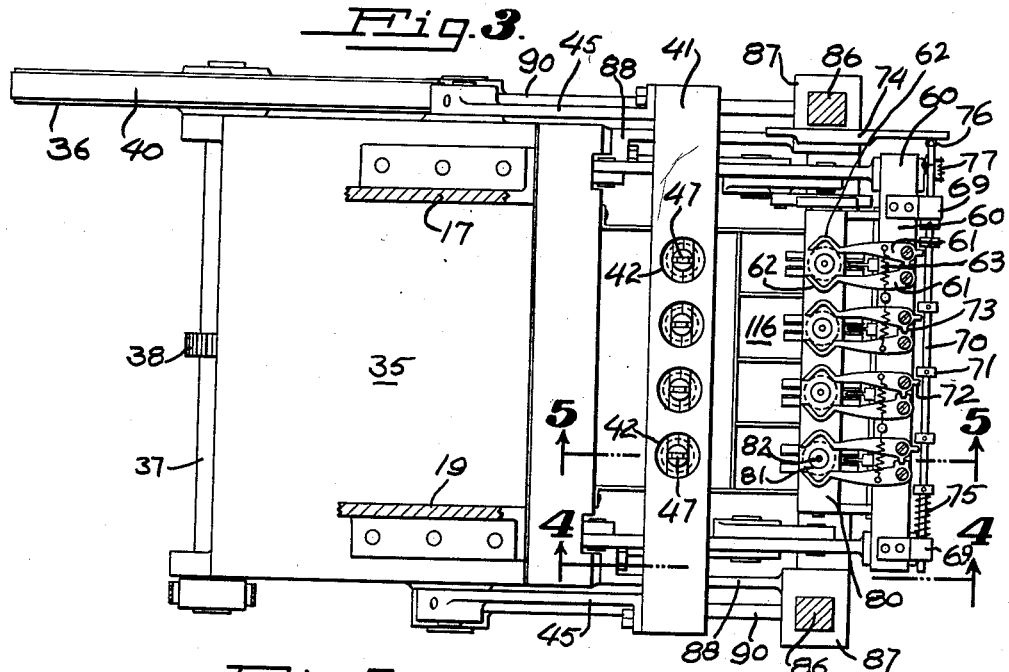
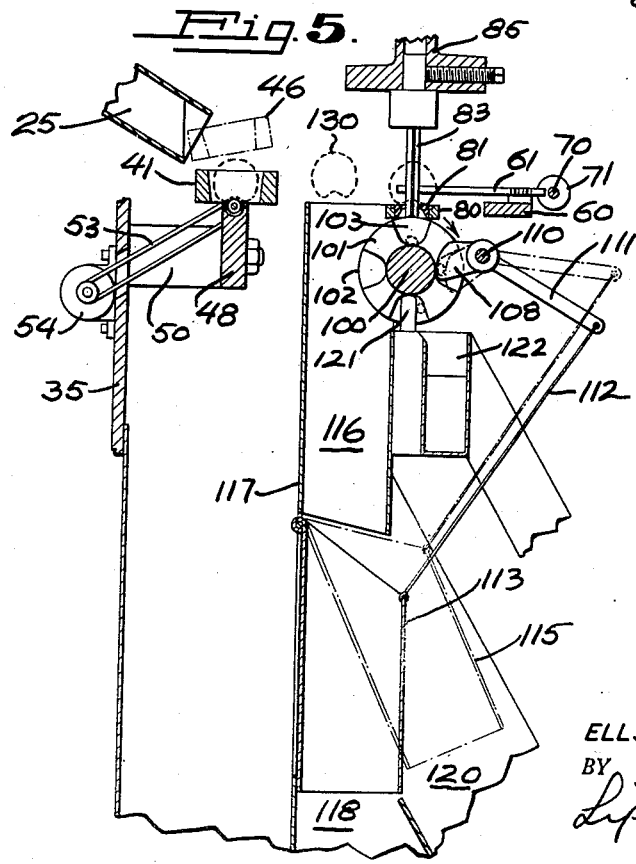
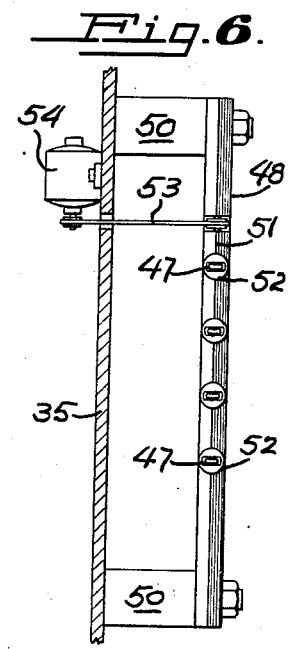
INVENTOR,
ELLSWORTH W. CARROLL.
BY
Lippincott & Metcalf
ATTORNEYS.

March 7, 1944.    E. W. CARROLL    2,343,496
SINGLE STAGE FRUIT ORIENTING AND PITTING MACHINE
Filed June 6, 1941    4 Sheets-Sheet 4
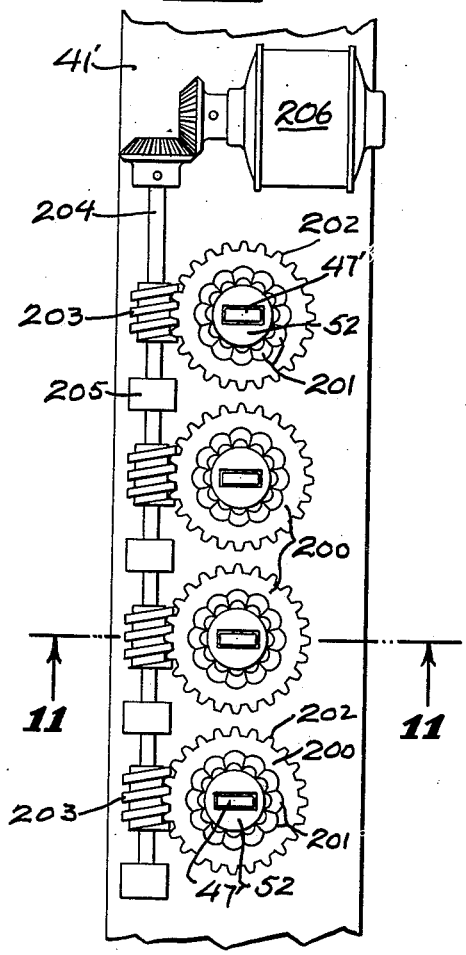
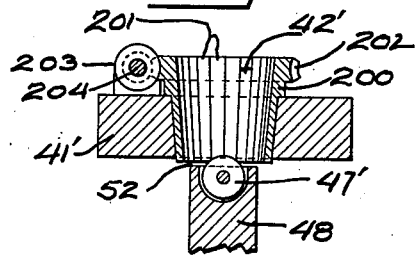
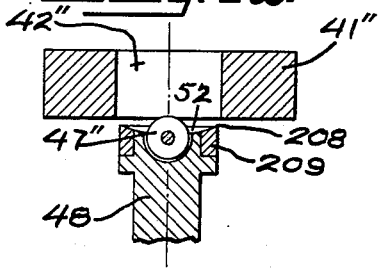
INVENTOR,
ELLSWORTH W. CARROLL.
BY
*Lippincott & Metcalf*
ATTORNEYS.

Patented Mar. 7, 1944

2,343,496

UNITED STATES PATENT OFFICE 2,343,496

SINGLE STAGE FRUIT ORIENTING AND PITTING MACHINE

Ellsworth W. Carroll, San Carlos, Calif., assignor to S & W Fine Foods, Inc., San Francisco, Calif., a corporation of California Application June 6, 1941, Serial No. 396,809

10 Claims. (Cl. 209—72)

My invention relates to fruit orienting and pitting machines and more particularly to such a machine utilizing only a single orienting stage, whereby a carrier may be dispensed with. The machine of my invention is ideally adapted for use in high speed automatic orienting and pitting of cherries.

The main object of my invention is to provide a fully automatic machine which will quickly orient indented fruit, such as cherries, in a single stage and thereafter transfer the oriented fruit to a pitting stage, where the fruit is pitted. Another object of my invention is to utilize in the aforesaid machine, if desired, apparatus for automatically inspecting fruit for proper position after the orientation operation has been performed on the fruit, and also to provide apparatus for automatically inspecting the fruit after pitting to separate the properly pitted fruit from any fruit which may still have a pit remaining therein.

The machine of the present application utilizes the orientation wheel described and claimed in conjunction with a carrier machine in my Patent No. 2,220,511, dated November 5, 1940, entitled "Continuous fruit orientating device," and also embodies the general principles of the rotary pit inspector shown, described and claimed in my prior application Serial No. 235,810, dated October 19, 1938, entitled "Pitting machine," except that in both cases as used herein, these inventions are applied in modified form to a machine which does not require a carrier.

Other objects of my invention will be apparent or will be specially pointed out in the description forming a part of this specification, but I do not limit myself to the embodiment of the invention herein described, as various forms may be adopted within the scope of the claims.

In the drawings:

Fig. 1 is a side view partly in elevation, and partly in section of one preferred form of my invention, comprising a single orienting stage and single pitting stage. For convenience and to avoid undue multiplicity of parts, only four rows of stations are shown in the drawings, although it will be obvious that by duplication more may be used.

Fig. 2 is a view in elevation looking at the lower part of the output end of the machine of Fig. 1.

Fig. 3 is a top view in elevation of the orienting and pitting assemblies only.

Fig. 4 is a view partly in section and partly in elevation taken as indicated by the line 4—4 in Fig. 3.

Fig. 5 is a view partly in section and partly in elevation taken as indicated by the line 5—5 in Fig. 3.

Fig. 6 is a fragmentary view showing the drive of the orienting wheels.

Fig. 7 is a view partly in section and partly in elevation taken as indicated by the line 7—7 in Fig. 1.

Figs. 8 and 9 are diagrammatical views showing how inspection is accomplished at the single orienting stage.

Fig. 10 is a top view in elevation of a modified fence bar for use on my device.

Fig. 11 is a sectional view taken as indicated by the line 11—11 in Fig. 10.

Fig. 12 is a view partly in section and partly in elevation showing a modified fence bar arrangement.

Referring directly to the drawings for more detailed description of my invention, and first to Fig. 1 for the general assembly of a preferred type of machine adapted to orient, inspect, and pit cherries, a hopper 10 is provided with a lower opening 11 whereby cherries in the hopper may come in contact with the periphery of a rotating hollow drum 12, this drum having parallel rows of fruit apertures 13 extending therethrough. Hollow drum 12 is open at one end to allow a stationary skid plate 15 to be inserted therein, this skid plate having a cylindrical surface 16 positioned adjacent the inner openings of fruit apertures 13, this skid plate being attached to side bracket 17 which also supports shaft 18 on which drum 12 is mounted. The other end of shaft 18 is mounted on opposite side bracket 19 and is rotated in a clockwise direction by pulley 9. Skid plate surface 16 is positioned beneath the apertures 13 from a line adjacent the lower edge 20 of hopper 10 around to a discharge position 21, an arcuate extent of slightly more than 180°. At the top of drum 12 is positioned a brush 21 mounted on shaft 22, this brush being rotated counter-clockwise by pulley 23 in order to insure the fact that only one fruit is carried around the drum 12 in each aperture 13. Outside the downwardly moving side of the drum 12 a retaining plate 24 is positioned, this retaining plate passing downwardly spaced from and in concentric relation to the periphery of the drum to terminate in output chutes 25. Each output chute is in line with each row of apertures 13, and in a four line machine, there will of course be four rows of apertures across the drum and four delivery chutes 25.

In order to insure that any broken or mashed fruit may be removed from the apertures 13 before they are again presented to the hopper, rotating piston gears 26 are provided having radial pistons 27 thereon entering each aperture after the aperture has passed the delivery chute. Each rotating piston gear is mounted on an arm 28 extended from skid plate 15, and is rotated by engagement of the piston 27 in apertures 13 as the drum rotates. As each piston 27 enters an aperture 13 fully it closely approaches a stationary scraper bar 30 positioned at the bottom of the drum 12 so that all material pushed out of the apertures by the pistons will be scraped from the end of the pistons. One piston gear 26 is provided for each row of apertures.

Side bracket 17 and opposite side bracket 19 which support shaft 18 on which drum 12 rotates, are attached to a gear box 35 forming the main body of the device and containing the various synchronized gears, cams, etc., to operate the machine, such mechanical arrangements being well known in the art and, therefore neither shown nor described. Gear box 35 is supported on legs 36 to raise the machine sufficiently off the floor to allow proper discharge of the fruit. Gear box 35 is energized by a large pulley 39 driving a power shaft 37 on which is mounted a main driving gear 38 as shown in Fig. 3 making connection with the gears and in the gear box. Main pulley 39 is driven in any convenient manner, such as by a motor 38' and belt 40.

Immediately below the outlet of each of the chutes 25 is positioned a horizontal fence bar 41 as shown from above in Fig. 3. This fence bar has therein a plurality of fruit retaining apertures 42, one of these apertures being positioned immediately below the outlet opening 42 of each chute, so that as the cherries roll down the chute, if the bar 41 is in proper position, they roll into apertures 42. Bar 41 is normally maintained in level position by bar actuating side arms 45 operated from within the gear box, these arms being capable of raising bar 41 upwardly to block the outlet openings 43 of the chutes 25 as shown by the broken line position 46 in Fig. 1. The results of such a movement will be described later.

Positioned beneath and coaxially positioned with respect to each aperture 42 in bar 41 is an orientation wheel 47, these wheels being mounted on a drive shaft extending along stationary wheel bar 48 spaced from the output side of gear box 35 by brackets 50. Bar 48 is narrow, and between wheels 47 has a sharp edge 51 on the upper surface thereof. Each wheel extends slightly above a circular platform 52 of predetermined diameter. The shaft carrying wheels 47 may be driven in any convenient manner, such as by a belt 53 and a wheel motor 54, this motor being fastened to the wall of gear box 35 on the interior thereof.

Means are provided to transfer fruit stably supported by circular surfaces 52 and wheels 47 on the wheel bar, to a pitting position. Such a transfer mechanism may comprise a transfer bar 60 on which are mounted four fruit clamps as shown in Fig. 3. Each fruit clamp consists of opposed arms 61 pivoted on bar 60 extending toward the gear box and terminating in fruit grasping surfaces 62. These arms are normally kept closed by arm springs 63.

Means are provided to reciprocate the clamp bar 60 to the orienting stages stopping in a position where each open pair of opposed fruit grasping surfaces 62 is in proper position to grasp a fruit stably supported on a wheel bar surface 52 and back to a position where the grasped fruit may be pitted. Such means are provided by fastening clamp bar 60 at each end thereof to a horizontal frame member 64, each of these frame members being pivoted to the upper end of parallel reciprocating arms 65 and 65' mounted on parallel shafts 66 and 66', one of each pair of which 66 is operated from within the gear box as shown in Fig. 4. The use of two parallel arms 65 and 65' on each end of bar 60 insures level travel of frame members 64 during reciprocation with a slight arcuate motion between the orientation stage and the pitting stage providing a clearing lift at each stage.

Control of the opening and closing of the clamps is accomplished by means of an opening rod 70 extending along bar 60 adjacent the bases of clamp arms 61, this rod having collars 71 thereon in position to engage lugs 72 extended from one of the clamp arms 61 in each pair. Clamp arms 61 are geared together adjacent the pivots thereof by gears 73, consequently the clamps are opened and closed in accordance with lateral movement of clamp bar 70. Clamp bar 70 is held in bearings 69 and is laterally moved by a stationary cam 74 positioned at one end of bar 60. One end of rod 70 is pressed by spring 75 to free collars 71 from lugs 72. The other end of rod 70 is provided with a cam roller 76, this roller being hinged to one side of the remainder of clamp rod 70 and maintained coaxially with said remainder by spring 77. The action of this hinged roller will be described later in describing the operation of the machine.

When the clamp arms are holding fruit in pitting position, the axis of each fruit and pair of holding surfaces 62 is directly over a pitting rubber bar 80 carrying a plurality of conventional pitting rubbers 81 having central apertures 82 through which the pit may be forced by pitting knives 83 carried by a pitting knife bar 85, usually of I-beam section. Pitting knife bar 85 is supported on each end thereof by upright slides 86 mounted in slide bearings 87 supported by bearing arms 88 extended from each side of gear box 35. The pitting knife bar is reciprocated by side pitting arms 90 mounted on pitting shaft 91 extending through and operated from inside the gear box, and connected to slides 86 by end links 92. Reciprocating motion of pitting arm 90 will raise and lower the pitting knife bar thus causing the pitting knives 83 to pass through any fruit held in the clamps and to discharge the pit therefrom.

Immediately below and parallel with the pitting rubber bar 80 is positioned a pit inspector shaft 100 as shown in Fig. 5, having mounted thereon spaced pit-receiving plates 101 between spacer plates 102, there being two spaced pit-receiving plates between each spacer plate, with one set of plates for each pitting rubber. Each of the two pit-receiving plates is symmetrically cut away to form four pit-receiving receptacles 103 in which pits from the pitted fruit may be deposited after passing through rubber apertures 82. Pit inspector shaft 100 is rotated in a clockwise direction a quarter turn at each reciprocation of the clamp bar with receptacles 103 presented to rubber apertures 82 during pitting. This is accomplished by mounting on each reciprocating arm 65', closest to the clamp bar, dogs 105 pressed against shaft end ratchet wheels 106 by springs 107. Dogs 105 are so arranged as to engage one of the teeth of each ratchet wheel 106 at the pitting end of the stroke, and thereafter, when moving toward the orienting stage, the engagement of each dog 105 with each ratchet wheel 106 will rotate the pit inspection shaft one quarter turn, thus moving a pit just deposited in any receptacle 103 beneath the pitting rubber, 90° to the right at which point a pit feeler 108 enters the cavity 103 between each two pit-receiving plates 101. Feelers 108 are pivoted on a shaft 110, and the feelers are extended on the other side of this shaft as operating arms 111. To the end of each operating arm 111 is attached an operating rod 112, this rod being attached to a deflector chute 113, this deflector chute being movable from its normal vertical position assumed under gravity to an angular position as indicated by the broken lines 115 if a pit forces a feeler 108 outwardly.

Both the top and bottom of each inspection chute 113 is open and a fruit chute 116 is directed into the top of each inspection chute 113, this latter chute being pivoted to the back wall 117 of the fruit chute 116. Consequently, any fruit dropping down a fruit chute 116 will be directed into an output chute 118 for improperly pitted fruit, or, if the inspection chute 113 has been moved to position 115 by pit contact, into an output chute 120 for properly pitted fruit. The pits, after having operated on feelers 108, are scraped out of the cavities 103 by scrapers 121 and fall into pit-receiving receptacle 122.

Having above described the construction of my machine, I will next describe the operation of this particular modification. Cherries are fed in bulk into hopper 10 and fall into apertures 13 in drum 12 and are carried around in a clockwise direction until they meet brush 21 which is rotating in a counter-clockwise direction. Brush 21 is adjusted to brush off all extra fruit so that only one fruit is in each aperture 13. The fruit is then carried around the drum until it reaches a position adjacent the output chutes 25. As the fruit is discharged from the drum into output chutes, the gearing in the gear box is adjusted so that the fence bar is in upper position 46, thus holding the fruit at the end of the chute. Thus I do not depend for timing on the fruit rolling down through chute 25 or on any accurate release of the fruit from apertures 13. Consequently drum 12 may be continuously rotated. At a certain time, as predetermined by the machinery within the gear box 35, the fence bar 41 lowers to horizontal position and the fruit held in the chutes 25 drops into fence apertures 42 where it is supported by the sides of the apertures and by the upper peripheral surfaces of wheels 47. The wheels are rotated by motor 54 and the fruit is rotated by frictional contact with the wheels just so long as a convex surface of the fruit contacts the wheels. When, however, the stem indent of a fruit registers with the wheel, the fruit will no longer be rotated by the wheel, as the wheel is made of sufficiently small diameter that the wheel will fit into and either not contact the stem indent at all or only lightly contact it. Consequently, properly oriented fruit will rest stably on surfaces 52.

After a predetermined length of time during which time the fruit is being operated on by the wheels and whether or not the fruit is properly oriented, the fence bar is again raised to position 46 ready to stop the downward progression of the next fruit through chutes 25. As the fence bar is raised, one of two conditions will exist, as shown in Figs. 8 and 9; either the fruit will remain stably supported by circular surface 52 as shown in Fig. 8, which means that the stem indent has registered with the wheel; or in the case of improperly oriented fruit, the fruit will fall off as shown in Fig. 9, due to the fact that the wheel extends upwardly beyond the level of surface 52 and the combined wheel and surface is not sufficient to support any fruit whose convex surface is presented thereto. Consequently, instantly the fence bar 41 is raised, all improperly positioned fruit fall off wheel bar 48 and will drop through to the bottom of the machine, where they may be caught and returned to hopper 10 for another run through the machine. Ridge 51 on wheel bar 48 is used so that any fruit which might roll off surfaces 52 laterally cannot possibly be held in stable position on the wheel bar.

As soon as the improperly oriented fruit have had time to roll off the surfaces 52, the clamp bar 60 is reciprocated toward the wheel surfaces 52. Just before the end of this movement of bar 60, roller 76 on the end of operating rod 70 controlling the opening and closing of the clamps, passes off the thicker portion of stationary cam 74, thus allowing the clamp arms to close and grasp any fruit which are resting stably on the surfaces 52. The clamp bar 60 is then progressed back toward the pitting stage. As the cam roller 76 again hits the thick part of stationary cam 74, the clamp arms do not open, because the hinged end of the rod 70 rotates against the tension of spring 77 without moving the operating rod 70, and therefore the clamp arms stay closed until they reach the other end of the stroke, where the clamped fruit is directly over the pitting rubbers 81. The pitting bar is then reciprocated to drive the pitting knives 83 through the fruit and push the pits from the fruit into pit receptacles 103 positioned below the rubbers. After the pitting knives 83 have been withdrawn, the clamp bar 60 again moves towards the orientation stage.

It will be noted that no strippers are necessary as the fruit is held during the withdrawal of the pitting knives by the clamp arms. As the clamp bar 60 moves again toward the orientation stage, still grasping the pitted fruit, the clamp bar 60 by virtue of the design of the internal cam operating the clamp bar, stops momentarily midway between the pitting stage and the orientation stage, just as roller 76 rides on to the thick part of stationary cam 74. As the operating rod 70, however, travelling in this direction will not hinge, the clamps are opened and the fruit drops out of the clamps in a position as shown by the dotted fruit outline 130 midway between the pitting stage and the orientation stage in Fig. 5.

The fruit, being released from the clamp arms, drops through fruit chute 116. Inasmuch as the inspector shaft 100 has been rotated a quarter turn by dogs 105 and ratchet wheels 106 during this movement of bar 60 from the pitting stage to the discharging position, inspection chute 113 has already been set to direct the dropped fruit into the proper output, depending upon whether or not a pit was discharged from the dropped fruit. Thus no fruit, unless it has had a pit removed therefrom, can be passed into the good fruit output chute 120.

During the pitting and discharging time, new fruit have been dropped into fence bar apertures 42 and are being oriented. After the momentary pause of bar 60 to allow the fruit to drop, the fence bar again moves upwardly and the clamp bar continues toward the orientation stage to pick up there the fruit, if properly oriented, and the cycle is repeated.

Thus it will be seen that the machine just above described delivers the fruit to a single orientation stage. The fruit is then inspected for proper position in that same stage simply by withdrawing the support of the fence apertures. Any stably supported fruit is then picked up by the clamps and taken to the pitting stage where the fruit is pitted. On the return the clamps stop at a discharge position, the clamp arms are opened and the fruit is dropped into one of two outputs, dependent upon whether or not the fruit has had a pit removed from it.

With regard to the cycle time of the machine, I have found that the overall efficiency of a single stage orientator is very little if any less than that of a multi-stage orientator such as has been described in my Patent No. 2,220,511 cited above. When a carrier is used, with multiple stage orientation, I have found that quite often a fruit which has been properly oriented in prior stages is disturbed from its proper orientation in subsequent stages. Thus the difference in the percentage of oriented fruit obtained in a single stage orientator as compared with the percentage attained in a multi-stage orientator is not so different as might at first appear. For example, I have found that it is quite possible to obtain percentages of from 70 to 75% where multiple stages of the same general construction would give at best from 80 to 85% of properly oriented fruit. By the term "properly oriented" used herein, I mean fruit which is oriented to such a close extent that the fruit will remain stably supported after inspection.

I have also found that the time required for a high percentage of proper orientation is surprisingly small. Experiments have shown that with the machine described and shown herein, approximately 60% of the fruit is oriented in the first fraction of a second, and that in order to appreciably raise the percentage, the time must be appreciably extended. Close observation of the action of the orienting device indicates that many cherries subjected to the orienting action of the wheels have their longest diameter corresponding to the axis of the fruit passing through the stem indent, the pit, and the blossom end of the fruit, and that such fruit may tend to rotate stably on the wheel around this axis with the wheel shaft parallel to this long diameter. Some of the fruit so rotating will rotate around this long axis substantially indefinitely if not disturbed. Consequently, I have provided a means for reducing any such a tendency towards stable rotation, to be used with batches of fruit which have a high percentage of fruit elongated in the direction of the main axis as above defined. Such means is shown in Figs. 10 and 11. In this modification the fence bar 41' is provided with rotatable inserts 200, these inserts having the fence apertures 42' therein. The inner walls of the apertures 42' are preferably provided with smooth regular serrations 201 and each of the inserts is provided with peripheral gear teeth 202 meshing with worms 203 mounted on a fence rotating shaft 204 extending along the fence bar and journaled in bearings 205. This shaft may be rotated by small fence motor 206 which is carried on the fence bar and moves with it. By rotating the fence inserts while the cherry is being rotated by the wheels 47', the tendency for the fruit to assume a stable position with its long axis parallel to the shaft of wheel 41' is frustrated, as the serrations on the rotating fence turn the long axis of the fruit toward the plane of the rotating wheel and the rotation thereof almost immediately brings the stem indent of the fruit in registry with the wheel.

I have found that when fruit which have a high percentage of elongated units are being run through the machine, that the use of the rotating fence will increase the percentage of properly oriented fruit by at least 10 or 15% and I have been able with a single stage, and by the use of the rotating fence, to properly orient and pass through the pitter more than 75% of the fruit passed through the machine, with an orientation time that does not exceed one second. I have also been able to orient and pass through the pitter more than 65% of all the fruit passed through the machine in an overall cycle of time less than one second, of which the orientation portion will be about ¾ of a second. In this manner, by using only a single stage and passing to the pitter only those fruit which are properly oriented in a second or less, I have been able to obtain a higher production from a single stage machine than has been heretofore obtainable with a multi-stage machine using a carrier and a longer operating cycle. Furthermore, the single stage machine is simpler and has fewer parts than the carrier type machine, and therefore can be operated at higher speeds with a consequent gain in output.

In case it is desired to operate the machine without inspection, such as may be desirable when running ungraded cherries differing largely in size, and when it is only necessary to orient more than 50% thereof, all that is necessary is to substitute for the small flat inspecting surface 52 of Fig. 8 and Fig. 11, a larger, and shallow cupped surface as shown in Fig. 12. Here the fruit supporting surface 208 is part of an annular platform 209 and of greater diameter than the inspecting surface 52. The fruit will remain on the surface 208 irrespective of whether or not the fruit are properly oriented. This eliminates the position inspection and passes all the fruit, irrespective of position, to the pitter, but it will give a large percentage of fruit a proper orientation and greatly aids in making the product uniform. The fence bar 41" having a cylindrical inner wall 42" may be used with such modified inspection surface.

Furthermore, it can also be seen that by varying the diameter of the inspecting surface 52 by the use of platforms 209 of varying diameters surrounding the wheel 47", that I am able to vary the leeway of inspection as desired. For example, if the surface 52 is of very small diameter, then all the fruit except those which are exactly centered on the wheel will roll off. If, however, the surface 52 is made of a slightly larger diameter, the wheel may be registered with the stem indent of a fruit but the fruit may be laterally cocked to some extent. This fruit will still be held on the platform in stable position by gravity. Thus, by varying the diameter of platform 52, I am able to obtain either strict inspection, or a general inspection which is less strict as to the actual position of the fruit.

It may be found desirable with certain fruit having a large percentage of shallow indents, to stop the rotation of wheels 47 during inspection. This is accomplished by energizing wheel motor 54 from a switch operated by the movement of fence bar 41 so that when the fence bar 41 rises to permit inspection, the wheel is no longer rotating. The instant the fence bar drops to the position just above the wheel, then the motor will be started again. Likewise, in the same manner, when the rotating fences are used as shown in Figs. 10 and 11, these fences may also be stopped from rotating during lifting of the fence arm.

I claim:

1. In a device for orienting indented fruit, a member having a horizontally extending substantially flat circular surface thereon, a fruit rovolving member projecting a substantially fixed distance above said surface, means for moving said fruit revolving member relative to said surface, and a separate member having a substantially circular aperture therein, said member being positioned with the wall of said aperture coaxially extending above the level of said surface to retain fruit over said surface and said fruit revolving member.

2. Apparatus in accordance with claim 1 wherein said separate member is movable away from said surface a sufficient distance to prevent fruit retention by said aperture wall.

3. Apparatus in accordance with claim 1 wherein said separate member is movable away from said surface a sufficient distance to prevent fruit retention by said aperture wall and wherein said surface has a diameter less than that capable of retaining thereon against gravity fruit with the convex surface thereof in contact with said fruit revolving member.

4. Apparatus in accordance with claim 1 wherein said separate member is movable away from said surface a sufficient distance to prevent fruit retention by said aperture wall and wherein said surface has a diameter substantially less than the diameter of the fruit being revolved.

5. Apparatus in accordance with claim 1 wherein said separate member is movable upwardly away from said surface a sufficient distance to prevent fruit retention by said aperture wall.

6. Orienting apparatus for idented fruit comprising a holder for said fruit, said holder having separate and coaxial upper and lower portions, a fruit revolving member on said lower portion, and means for simultaneously revolving said fruit revolving member and said upper portion in different planes.

7. Orienting apparatus for indented fruit comprising a holder having a bottom and a separate rotatably mounted substantially cylindrical side wall, a fruit revolving wheel projecting into the bottom of said holder to engage a fruit in said holder, and means for simultaneously rotating said wheel and said side wall.

8. Orienting apparatus for indented fruit comprising a holder for said fruit, said holder having co-axial upper and lower portions, a fruit rotating member applied to the bottom of a fruit supported by said holder, said upper portion including a fruit rotating member applied to the sides of said fruit in said holder, and means for driving both of said members.

9. Means for orienting indented fruit comprising a holder for said fruit, means for rotating said fruit around a horizontal axis while in said holder and separate rotatable means forming part of said holder for simultaneously rotating said fruit around a vertical axis.

10. Apparatus in accordance with claim 9 wherein said means for rotating said fruit around a horizontal axis enters the stem indent of said fruit when the stem indent of said fruit is presented thereto, to preclude further rotation of said fruit about the horizontal axis.

ELLSWORTH W. CARROLL.